B. J. DOWNEY.
Stench-Trap.
No. 207,492.  Patented Aug. 27, 1878.
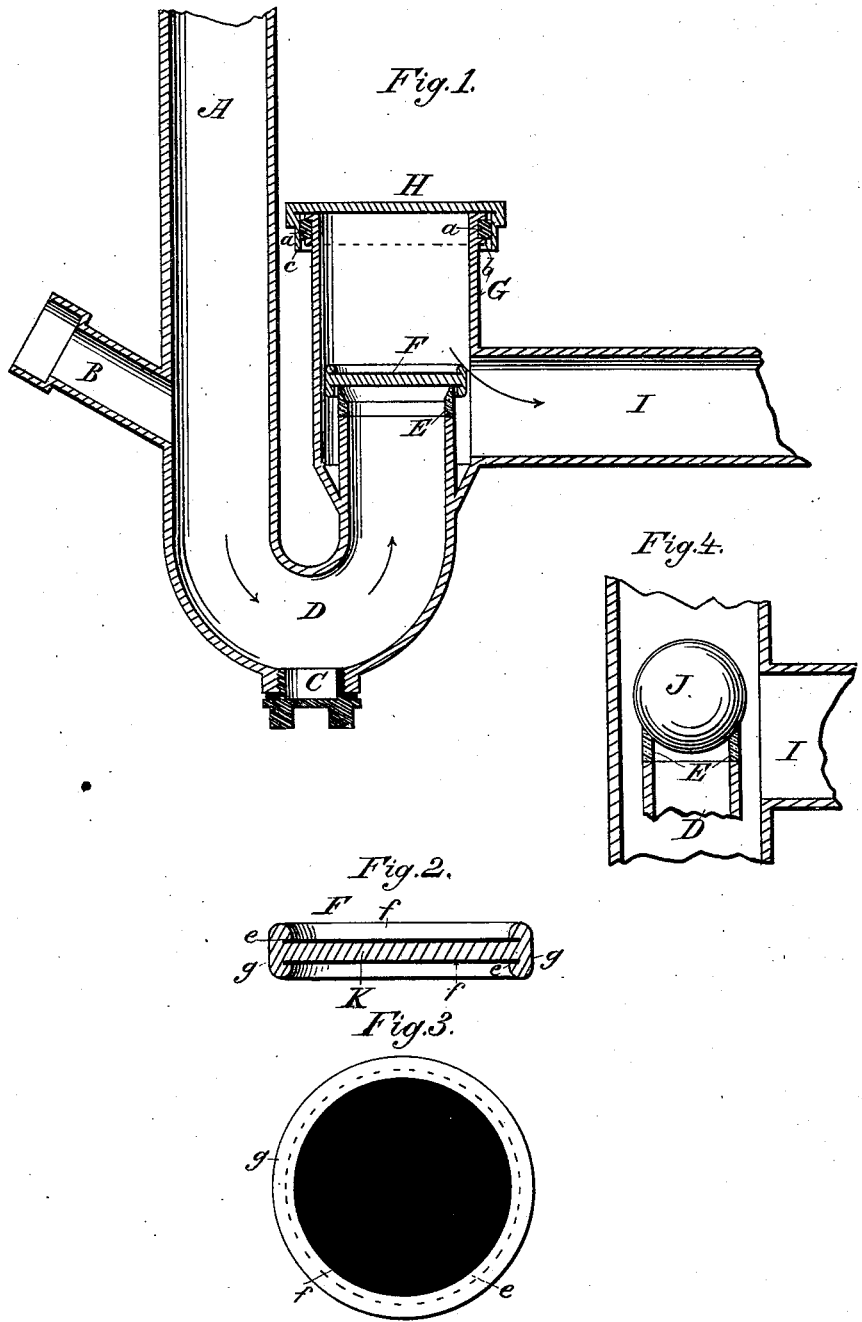

UNITED STATES PATENT OFFICE.

BERNARD J. DOWNEY, OF WASHINGTON, DISTRICT OF COLUMBIA.

IMPROVEMENT IN STENCH-TRAPS.

Specification forming part of Letters Patent No. 207,492, dated August 27, 1878; application filed July 22, 1878.

*To all whom it may concern:*

Be it known that I, BERNARD J. DOWNEY, of Washington, in the District of Columbia, have invented certain new and useful Improvements in Traps; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to protect the water-seal in the trap from the effects of siphonage or the back flow of water or gas, thus preventing the escape of sewer-gas into the rooms of dwelling-houses.

A further object is to provide the inlet-limb of the trap with a pipe or projection adapted to receive the overflow-water of the basin, closet, &c.

In order to enable those skilled in the art to make and use my invention, I will proceed to describe it, referring to the annexed drawings, in which—

Figure 1 is a vertical section of the trap. Fig. 2 is a vertical section of the disk-valve. Fig. 3 is a top view, showing clearly one of the flexible pads of the disk-valve. Fig. 4 is a vertical section, showing a ball-valve applied to the valve-seat instead of a disk-valve.

A is the inlet-limb of the trap. B is a pipe or extension, adapted to receive the overflow-pipe of the basin, &c., thus rendering one trap sufficient to prevent the escape of gas, and making unnecessary the use of a trap or plug in immediate connection with the waste-holes. The location of said pipe B on the inlet-limb A may be where convenience dictates.

C is a screw-plug, of ordinary construction, and may be removed when desirable to clean the bend of the trap.

The trap-bend D rises into and terminates in a chamber, G. The end of said bend is provided with a valve-seat, E, of brass, ground or otherwise formed in the shape shown, at its inner upper portion. As seen, the valve-seat has a sharp circular edge, making a tight joint with the valve above it.

The valve-seat E may be united to the pipe below it by a solder-joint, or by a screw-thread joint. Its position in respect to the chamber G and pipe I may be varied as circumstances demand.

I have shown the valve-seat E as made of brass; but any suitable metal or vulcanized rubber may be employed.

The disk-valve F is formed of a central portion, K, which is entirely surrounded by a thickened rim, $g\,g$. Where the central portion K joins the rim $g\,g$ is formed, on either side, undercut grooves $e\,e$. Into these grooves are sprung rubber pads $f\,f$.

The main body K and the rim $g\,g$ may be constructed of any material which will give sufficient strength and lightness.

The main body and the raised portions might be of sheet metal, the latter being bent over and upon the pads to confine them.

The chamber G surrounds the valve and seat, the outlet-pipe I leading away from the right-hand side of it. At the top it is formed with a groove, $a$, for the reception of a packing, $b$. The cover H has a depending flange, $c$, which passes closely over the packing, and forms a tight joint.

The dimensions of chamber G may be varied as to height and diameter without departing from my invention. In certain cases where the disk-valve might become wedged in the chamber, I should remedy the defect by a change of dimensions.

I have shown the main parts of the trap as cast in one piece; but I might make the pipe B, the chamber G, and the outlet I separately and unite them by suitable joints.

In Fig. 4 I show a ball-valve, J, combined with the metallic valve-seat. It is obvious that either form of valve may be used to advantage, and may be regarded as equivalents.

What I claim is—

1. In a trap, the disk-valve F, composed of the main part K, the thickened rim $g\,g$, having the undercut grooves $e\,e$, and the flexible pads $f\,f$, substantially as shown and described.

2. In a trap, the disk-valve F, constructed as shown and described, in combination with the knife-edged metallic valve-seat E, for the purpose set forth.

3. In a trap, the bend D, terminating in the metallic valve-seat E, combined with the valve F, the chamber G, and the outlet I, substantially as shown and described.

4. The combination of the limb A, the projection B, and the bend D, having a metallic valve-seat, E, with the chamber G, valve F, and outlet I, substantially as set forth.

In testimony that I claim the foregoing as my own I affix my signature in presence of two witnesses.

BERNARD J. DOWNEY.

Witnesses:
E. A. DICK,
H. W. CRAGIN.